United States Patent
Nonaka et al.

(10) Patent No.: US 7,969,322 B2
(45) Date of Patent: Jun. 28, 2011

(54) PROCESSOR

(75) Inventors: Masao Nonaka, Osaka (JP); Kazuhiko Yamauchi, Osaka (JP); Yoshiaki Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 1031 days.

(21) Appl. No.: 11/597,415

(22) PCT Filed: Sep. 20, 2005

(86) PCT No.: PCT/JP2005/017310
§ 371 (c)(1),
(2), (4) Date: Nov. 22, 2006

(87) PCT Pub. No.: WO2006/038455
PCT Pub. Date: Apr. 13, 2006

(65) Prior Publication Data
US 2008/0071933 A1    Mar. 20, 2008

(30) Foreign Application Priority Data
Oct. 5, 2004   (JP) ................................. 2004-293041

(51) Int. Cl.
G08B 5/00 (2006.01)
(52) U.S. Cl. ..................................... 340/815.4; 710/305
(58) Field of Classification Search ............... 340/815.4, 340/815.45, 815.65, 815.66, 815.67; 710/305, 710/306
See application file for complete search history.

(56) References Cited

U.S. PATENT DOCUMENTS

| | | | |
|---|---|---|---|
| 5,406,386 A * | 4/1995 | Yamada ......................... | 358/406 |
| 5,978,829 A | 11/1999 | Chung et al. | |
| 6,067,168 A * | 5/2000 | Nishiyama et al. .......... | 358/1.16 |
| 6,127,933 A * | 10/2000 | Ohmura et al. ............. | 340/636.1 |
| 6,141,112 A | 10/2000 | Nishiyama et al. | |
| 6,268,845 B1 * | 7/2001 | Pariza et al. ................... | 345/581 |
| 6,400,465 B1 | 6/2002 | Nishiyama et al. | |
| 6,526,491 B2 | 2/2003 | Suzuoki et al. | |
| 6,720,863 B2 * | 4/2004 | Hull et al. ..................... | 340/7.51 |
| 6,735,619 B1 | 5/2004 | Sawada | |
| 6,809,734 B2 | 10/2004 | Suzuoki et al. | |
| 6,826,662 B2 | 11/2004 | Suzuoki et al. | |
| 6,993,618 B2 * | 1/2006 | Chen et al. ..................... | 710/305 |
| 7,046,791 B2 * | 5/2006 | Itoh .......................... | 379/373.03 |
| 7,093,104 B2 | 8/2006 | Suzuoki et al. | |
| 7,466,817 B2 * | 12/2008 | Toda .............................. | 379/361 |
| 7,546,357 B2 * | 6/2009 | Manchester et al. .......... | 709/220 |
| 2002/0138637 A1 | 9/2002 | Suzuoki et al. | |
| 2003/0229765 A1 | 12/2003 | Suzuoki et al. | |
| 2004/0204151 A1 * | 10/2004 | Muthuswamy et al. ....... | 455/567 |
| 2004/0207722 A1 * | 10/2004 | Koyama et al. ............ | 348/14.02 |
| 2005/0078117 A1 | 4/2005 | Suzuoki et al. | |

(Continued)

FOREIGN PATENT DOCUMENTS

JP     9-233253     9/1997

(Continued)

Primary Examiner — George A Bugg
Assistant Examiner — Edny Labbees
(74) Attorney, Agent, or Firm — Wenderoth, Lind & Ponack, L.L.P.

(57) ABSTRACT

A processing apparatus that is connected with another processing apparatus via a network, receives a request for a processing from the other processing apparatus, executes the requested processing while not performing an originally intended process of the processing apparatus, and indicates that the processing apparatus is executing the requested processing, by causing an indicator to blink on and off.

11 Claims, 9 Drawing Sheets

U.S. PATENT DOCUMENTS

| | | |
|---|---|---|
| 2005/0081209 A1 | 4/2005 | Suzuoki et al. |
| 2005/0081213 A1 | 4/2005 | Suzuoki et al. |
| 2005/0097302 A1 | 5/2005 | Suzuoki et al. |
| 2005/0120187 A1 | 6/2005 | Suzuoki et al. |
| 2005/0120254 A1 | 6/2005 | Suzuoki et al. |
| 2005/0138325 A1 | 6/2005 | Hofstee et al. |
| 2007/0081646 A1* | 4/2007 | Cupal et al. ............ 379/142.06 |

FOREIGN PATENT DOCUMENTS

| | | |
|---|---|---|
| JP | 10-143381 | 5/1998 |
| JP | 2001-053779 | 2/2001 |
| JP | 2001-325238 | 11/2001 |
| JP | 2001-339484 | 12/2001 |
| JP | 2003-281107 | 10/2003 |

* cited by examiner

| 3211 — USER NAME | PAPA | MAMA | ICHIRO |
|---|---|---|---|
| 3212 — BLINKING INTERVAL | FAST | NORMAL | SLOW |

3210

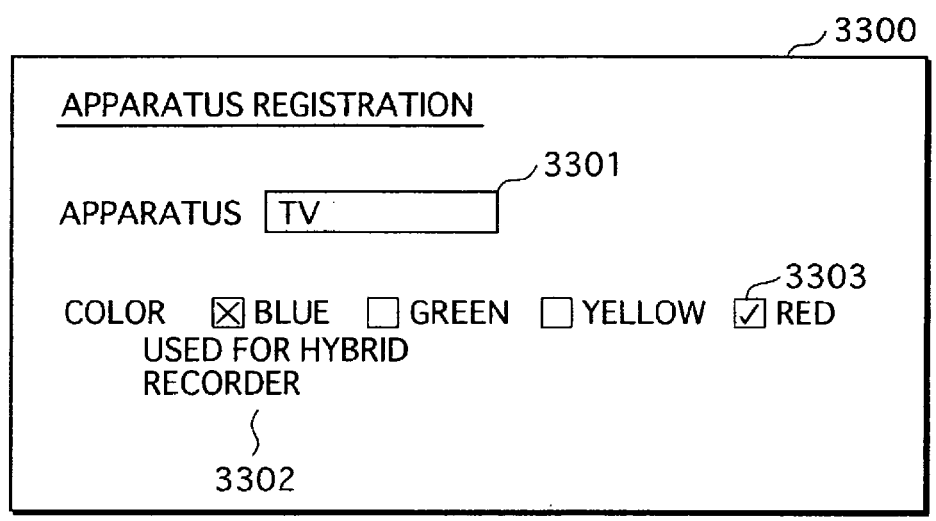

PROCESSOR

TECHNICAL FIELD

The present invention relates to a technology for using a processing apparatus on a network, and specifically to a technology for improving convenience in using an apparatus that is requested by another apparatus on the network to perform a process.

BACKGROUND ART

There has been a known technology of using a plurality of computers on a network to perform distributed processing.

The technology enables a plurality of computers to perform processes in parallel, enabling a large amount of processes to be performed at high speeds even if each computer has low performance.

Also, there have been developed some home electric appliances that are provided with information processing functions. Under these circumstances, there has been proposed a technology for connecting such home electric appliances to a network and using the processing functions thereof. That is to say, there has been proposed a technology for achieving distributed processing computing on a home network. For example, a home electric appliance can complete a time-consuming process such as transcoding of image data by using processing functions of other home electric appliances.

DISCLOSURE OF THE INVENTION

The Problems the Invention is Going to Solve

Off course, however, in a home, a member of the family may want to use a home electric appliance any time for its original purpose, or may power it off to save on electricity. There may be some inconveniences under these circumstances. For example, the home electric appliance cannot be used for its original purpose if it is performing some process for the sake of another apparatus. Also, if the home electric appliance is powered off while it is performing some process, the hard disk may have a crash and an apparatus having requested it to perform the process may have to return the procedure back.

Also, it is predicted that in the future, a home electric appliance that supports multiple users will appear. Such a home electric appliance will be a digital television, a hybrid recorder, or a game machine that can identify a plurality of users and can display a message or a screen that corresponds to the user who is currently using the home electric appliance.

It is therefore an object of the present invention to provide an apparatus that enables members of a family to easily recognize whether or not they can use the apparatus for its original purpose or whether or not they can power it off when the apparatus, which is connected to a home network, is performing a process by request from another apparatus on the home network.

Means to Solve the Problems

The above-stated object is fulfilled by a processing apparatus connected with another processing apparatus via a network, comprising: a receiving unit operable to receive from said another processing apparatus a request for processing; an execution unit operable to execute the requested processing while not performing an originally intended process thereof; and an indicating unit operable to indicate that the requested processing is being executed.

Effects of the Invention

With the above-stated construction, the processing apparatus of the present invention is able to indicate that the processing apparatus is executing a processing requested by another processing apparatus on the network. This enables the users to judge whether or not they can use the processing apparatus.

The above-described may further comprise a lighting device, wherein the receiving unit further receives lighting information that includes a blinking interval, and the indicating unit, when the execution unit executes the requested processing, indicates that the requested processing is being executed, by causing the lighting device to blink on and off at the blinking interval included in the lighting information.

The above-described processing apparatus may further comprise a lighting device, wherein the receiving unit further receives lighting information that includes a lighting color, and the indicating unit, when the execution unit executes the requested processing, indicates that the requested processing is being executed, by causing the lighting device to light with the lighting color included in the lighting information.

With the above-stated constructions, the processing apparatus of the present invention causes the lighting device to blink on and off at a certain blinking interval or to light with a certain lighting color when it is executing a processing requested by another processing apparatus on the network. This enables the users to judge whether or not they can use the processing apparatus.

The above-described processing apparatus may further comprise a lighting device and a storage unit operable to store information that indicates a correspondence between said another processing apparatus and lighting information that includes a blinking interval, wherein the receiving unit further receives request source information indicating said another processing apparatus as a request source, and the indicating unit, when the execution unit executes the requested distributed processing, indicates the request source of the distributed processing, by causing the lighting device to blink on and off at the blinking interval that corresponds to said another processing apparatus according to the lighting information.

The above-described processing apparatus may further comprise a storage unit operable to store information that indicates a correspondence between said another processing apparatus and lighting information that includes a lighting color, wherein the receiving unit further receives request source information indicating said another processing apparatus as a request source, and the indicating unit, when the execution unit executes the requested distributed processing, indicates the request source of the distributed processing, by causing the lighting device to light with the lighting color included in the lighting information.

With the above-stated construction, when it is executing a processing requested by another apparatus on the network, the processing apparatus causes the lighting device to blink on and off at a blinking interval corresponding to the apparatus that requested the processing, or to light with the lighting color corresponding to the apparatus that requested the processing. This enables the users to recognize which apparatus requested the processing that the processing apparatus is currently executing, and judge whether or not they can use the processing apparatus.

In the above-described processing apparatus, the lighting information stored in the storage unit may indicate one or more blinking intervals that respectively correspond to one or more users of said another processing apparatus, the request source information received by the receiving unit may further include information that indicates a user who uses said another processing apparatus, and when the execution unit executes the requested distributed processing, the indicating unit indicates the request source of the distributed processing by causing the lighting device to blink on and off at one of the one or more blinking intervals that corresponds to the user according to the information stored in the storage unit.

With the above-stated construction, when it is executing a processing requested by another apparatus on the network, the processing apparatus causes the lighting device to blink on and off at a blinking interval corresponding to a person who requested the processing. This enables the users to recognize who requested the processing that the processing apparatus is currently executing, and judge whether or not they can use the processing apparatus.

BRIEF DESCRIPTION OF THE DRAWING

FIG. 6A shows an example of a screen for registering colors for each apparatus all at once.

FIG. 6B shows the construction of the color data for each apparatus, and an example of the set colors.

| | Description of Characters |
|---|---|
| 1000 | hybrid recorder |
| 1100, 2100, 4100 | user interface unit |
| 1200 | lighting information registration processing unit |
| 1300 | lighting information storage unit |
| 1400 | control unit |
| 1500 | request job data generating unit |
| 1510 | request job data |
| 1600, 2500, 4300 | transmission/reception unit |
| 2000 | game machine |
| 2200 | lighting control unit |
| 2300 | requested job executing unit |
| 2400 | request job data analyzing unit |
| 2900 | enlargement |
| 3100 | color registration screen |
| 3110 | color data |
| 3200 | blinking interval setting screen |
| 3210 | blinking interval data |
| 3310 | apparatus color data |
| 3300 | apparatus color registration screen |
| 4000 | lighting information server apparatus |
| 4200 | lighting information storage unit |
| 7000 | personal computer |
| 8000 | digital television |
| 9000 | home network |

BEST MODE FOR CARRYING OUT THE INVENTION

<Outline>

A processing apparatus of the present invention has a function, when it is not performing an originally intended process, to perform a process requested from another apparatus on a same network, and to inform a user that it is performing the requested process.

The present invention is characterized by enabling the user to immediately recognize visually by the color of an indicator and by the speed at which the indicator blinks on and off, which apparatus requested to perform the process and what process the processing apparatus is performing.

With such a construction, the user can recognize which apparatus requested the process, what process the processing apparatus is performing and the like without going through the trouble of inputting a command or the like. This prevents the user from carelessly stopping the process, and enables the user to stop the process intentionally.

The following describes a processing apparatus as an embodiment of the present invention.

In the present embodiment, it is presumed that a content is recorded in an internal HDD (Hard Disk Drive) of a hybrid recorder 1000, and the hybrid recorder 1000 outputs the content to DVD (Digital Versatile Disk) being another storage medium. It is also presumed that HDD and DVD are different from each other in the method of compressing data to store therein, and converting the content is a time-consuming process.

<Construction>

Figure 1:
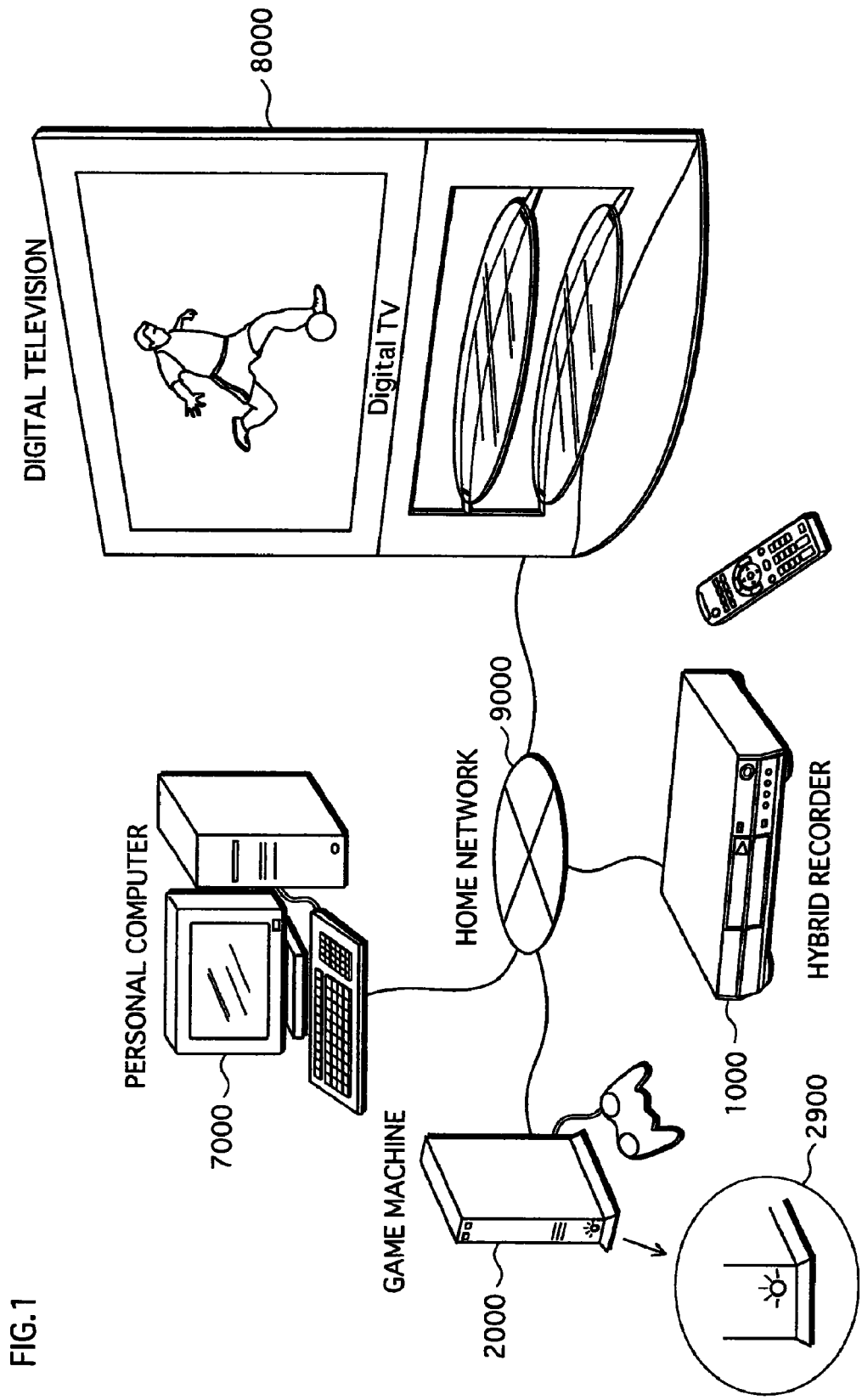
FIG. 1 shows an example in which the processing apparatus of the present invention is performing a process.

FIG. 1 shows an example in which the processing apparatus of the present invention is performing a process.

As shown in FIG. 1, a home network 9000 connects a digital television 8000, a personal computer 7000, a hybrid recorder 1000, and a game machine 2000 to each other.

It is presumed here that a content recorded on HDD of the hybrid recorder 1000 is being output to DVD.

It is presumed here that contents conforming to the compression method MPEG2 (Moving Picture Experts Group phase 2) are recorded on HDD, and that contents conforming to the compression method MPEG4 (Moving Picture Experts Group phase 4) are recorded on DVD.

FIG. 1 shows that the hybrid recorder 1000 has requested the game machine 2000 to perform part of a process of converting the compression method of the content, and the game machine 2000 is performing the requested process.

Since it is performing the content conversion process, which is a requested process and not the originally intended process, the game machine 2000 causes an indicator to light blue and blink on and off. An enlargement 2900 shows the indicator of the game machine 2000.

Figure 2:
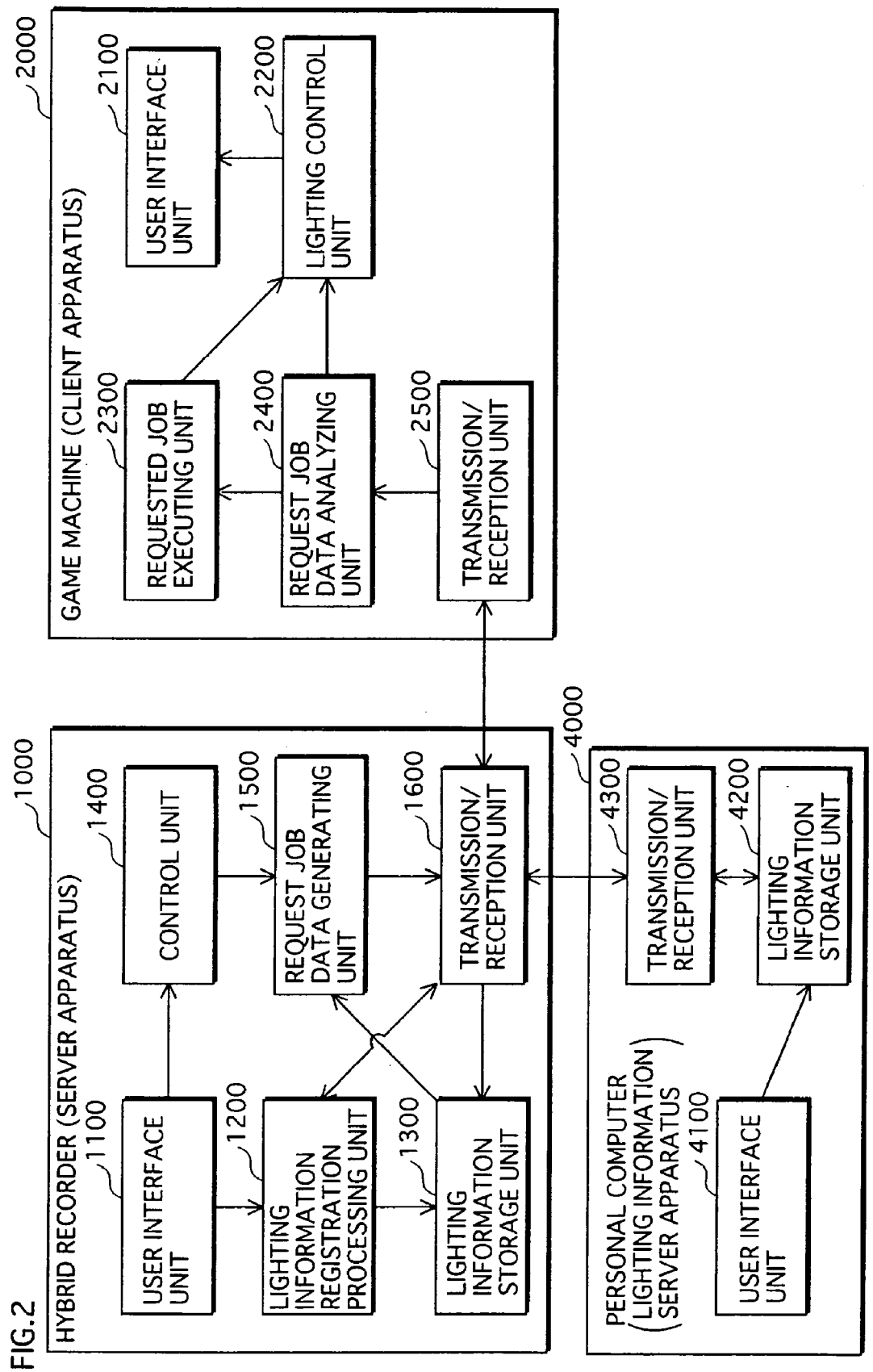
FIG. 2 is a block diagram showing the construction of the hybrid recorder 1000, game machine 2000, and lighting information server apparatus 4000.

FIG. 2 is a block diagram showing the construction of the hybrid recorder 1000, game machine 2000, and lighting information server apparatus 4000.

The hybrid recorder 1000 is a requesting side, and the game machine 2000 is a requested side. In other words, the hybrid recorder 1000 is a server apparatus and the game machine 2000 is a client apparatus. Although the hybrid recorder 1000 is a server side in the present example, any apparatus on the network can be either a server side or a client side depending on the situation.

The lighting information server apparatus 4000 manages the display colors of the lighted indicator such that the colors indicate different apparatuses. It is presumed in the present embodiment that the personal computer 7000 functions as the lighting information server apparatus 4000.

The hybrid recorder 1000 includes a user interface unit 1100, a lighting information registration processing unit 1200, a lighting information storage unit 1300, a control unit 1400, a request job data generating unit 1500, and a transmission/reception unit 1600.

The user interface unit 1100 is composed of an operation panel, a remote controller, a display, an indicator or the like that are provided in the hybrid recorder 1000, and has functions for exchanging information with the user, such as presenting information to the user and receiving an instruction from the user.

Figure 4A:
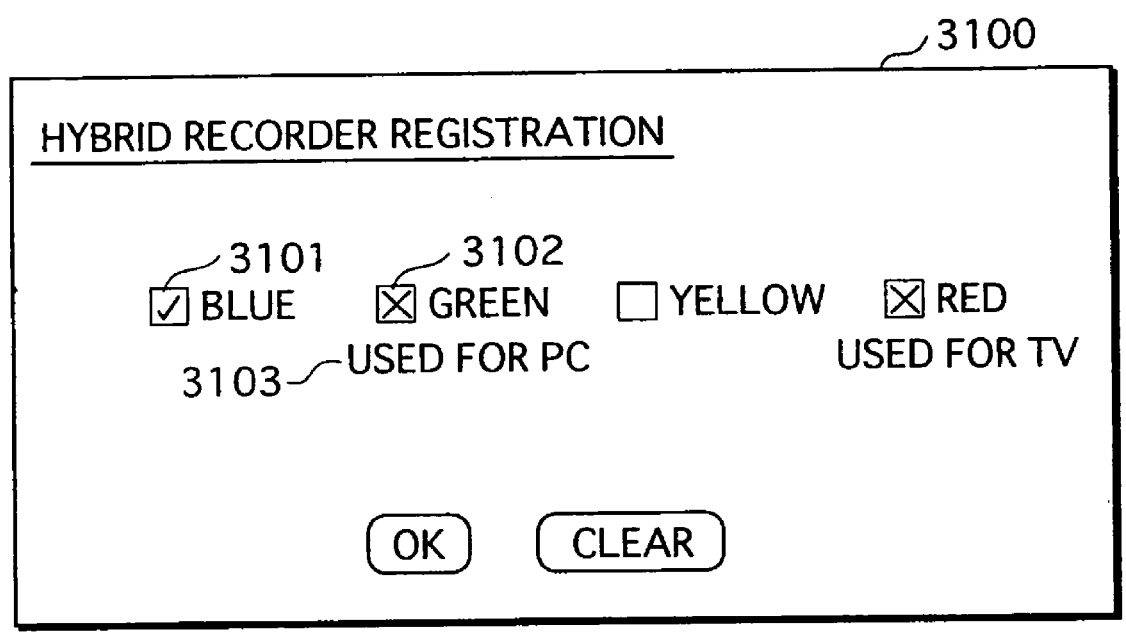
FIG. 4A shows an example of a screen for setting the color of the indicator in a requesting-side apparatus to indicate that the apparatus itself requested a process.
Figures 5A, 5B:
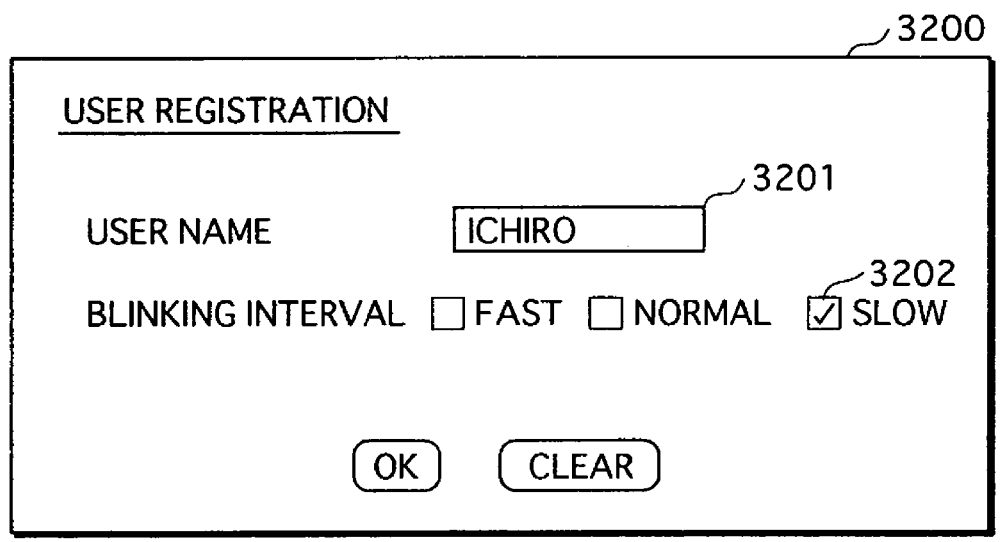
FIG. 5A shows an example of a screen for setting the blinking interval of the indicator to indicate the user who requested the process.
FIG. 5B shows the construction of the blinking interval data, and an example of the set blinking interval.

In the present embodiment, the user interface unit 1100 displays a screen for the registration of lighting information for each apparatus, and acquires settings of the user (see FIG. 4A and FIG. 5A).

The lighting information registration processing unit 1200 has a function to store the lighting information, which is input by the user via the user interface unit 1100, into the lighting information storage unit 1300.

The lighting information registration processing unit 1200 also has a function to transmit the lighting information, which is input by the user, to the lighting information server apparatus 4000 via the transmission/reception unit 1600.

The lighting information storage unit 1300 has a function to store data received from the lighting information registration processing unit 1200. More specifically, the lighting information storage unit 1300 stores color data 3110 and blinking interval data 3210 that will be explained later (see FIG. 4B and FIG. 5B).

The control unit 1400 has a function to control each function of the hybrid recorder 1000. The hybrid recorder 1000 has functions of a normal hybrid recorder, such as a recording function, reproduction function, dubbing function and the like. The hybrid recorder 1000 supports both HDD and DVD. It should be noted here that such regular functions are not illustrated in the drawings.

The hybrid recorder 1000 has a function to convert a content recorded in the HDD from MPEG2 to MPEG4 and store the converted content into the DVD. The hybrid recorder 1000 has a function to request the game machine 2000, which is one of the home electric appliances connected to the home network 9000, to perform part of the conversion process.

The control unit 1400 controls the functions unique to the present invention, as well as the regular functions. For example, one of the functions unique to the present invention is that when the hybrid recorder 1000 transmits a request for a process to another apparatus on the network, it also transmits, to the same destination, information that notifies the user of the other apparatus that the request was transmitted by the hybrid recorder 1000.

The request job data generating unit 1500 has a function to generate request job data for a job to be executed by the other apparatus, under control of the control unit 1400.

The transmission/reception unit 1600 has a function to exchange data with the game machine 2000 being a client apparatus.

The game machine 2000 includes a user interface unit 2100, a lighting control unit 2200, a requested job executing unit 2300, a request job data analyzing unit 2400, and a transmission/reception unit 2500.

The user interface unit 2100 is composed of a controller, an operation panel, an indicator or the like that are provided in the game machine 2000, and has functions for exchanging information with the user, such as presenting information to the user and receiving a game instruction from the user.

In the present embodiment, the indicator of the user interface unit 2100 mainly indicates that the game machine 2000 is performing a process that is not the originally intended process, where the originally intended process is an execution of a game.

The lighting control unit 2200 has a function to control the lighting on and off of the indicator of the user interface unit 2100 and to control the color and lighting interval thereof. The requested job executing unit 2300 has a function to execute a job, namely a process requested by another apparatus on the home network 9000.

The request job data analyzing unit 2400 has a function to divide request job data, which is received from another apparatus on the home network 9000, into a job data portion that is related to the requested job and a lighting data portion, and request the requested job executing unit 2300 and the lighting control unit 2200 to perform the processes, respectively.

The request job data analyzing unit 2400 also has a function to determine whether or not the apparatus is executing an originally intended process. The request job data analyzing unit 2400 requests the requested job executing unit 2300 and the lighting control unit 2200 to perform respective processes while the apparatus is not executing the originally intended process.

The transmission/reception unit 2500 has a function to exchange data with the hybrid recorder 1000 being a server apparatus.

The lighting information server apparatus 4000 includes a user interface unit 4100, a lighting information storage unit 4200, and a transmission/reception unit 4300.

The user interface unit 4100 is composed of a display, a keyboard, an indicator or the like provided in the personal computer 7000, and has functions for exchanging information with the user, such as presenting information to the user and receiving an instruction from the user.

In the present embodiment, the main function of the user interface unit 4100 is to display a screen for the registration of lighting information for each apparatus, and to acquire settings of the user (see FIG. 6A).

The lighting information storage unit 4200 has a function to store color data for each apparatus received from the user interface unit 4100. More specifically, the lighting information storage unit 4200 stores apparatus color data 3310 which will be explained later (see FIG. 6B).

The transmission/reception unit 4300 has a function to exchange data with the hybrid recorder 1000 being a server apparatus.

<Data>

Figure 3:
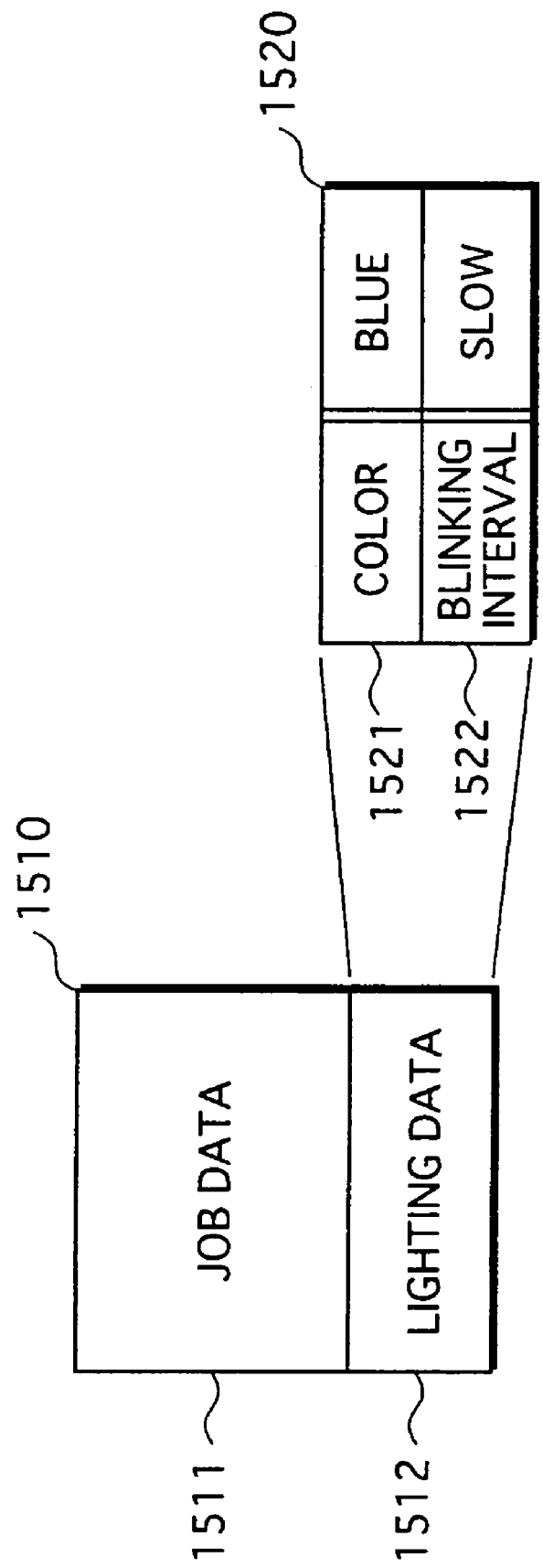
FIG. 3 shows the construction and contents examples of request job data 1510.

The following describes the data that is mainly used in the processing apparatus, with reference to FIGS. 3-6. FIG. 3 shows the construction and contents examples of request job data 1510.

The request job data 1510 is transmitted from the hybrid recorder 1000 to the game machine 2000 when a job is requested, and is generated by the request job data generating unit 1500. The request job data 1510 is composed of job data 1511 and lighting data 1512.

The job data 1511 is data of a job that is requested from the hybrid recorder 1000 to the game machine 2000. The job data 1511 includes, for example, instruction sentences and a content that has been generated conforming to MPEG2.

The lighting data 1512 is lighting information for the indicator of the game machine, and the indicator is lighted based on the data.

The lighting data 1512 is composed of a color 1521 and a blinking interval 1522. The color 1521 is a color of the lighted indicator. The blinking interval 1522 is an interval at which the indicator blinks on and off.

FIGS. 4A to 6B show examples of screens for setting information regarding the lighting of the indicator, constructions of the set information, and examples of the set information.

In the present embodiment, it is presumed that the color of the indicator indicates an apparatus that requested the currently performed process, and the blinking speed of the indicator indicates a member of the family who requested the process. It is presumed here that the requester of the process can be set for each apparatus.

Figure 4B:
FIG. 4B shows the construction of the color data, and an example of the set color.

FIG. 4A shows an example of a screen for setting the color of the indicator in a requesting-side apparatus to indicate that the apparatus itself requested a process. FIG. 4B shows the construction of the color data, and an example of the set color.

A color registration screen 3100 is displayed for each apparatus so that a different color can be specified for each apparatus for indication thereof.

The example shows a registration of a color for the hybrid recorder 1000. The check box 3101 for blue is currently checked. It should be noted here that the check box 3102 for green cannot be checked since green has already been used, as the message 3103 "Used for PC (Personal Computer)" indicates.

The color data 3110 indicates the color of the apparatus itself. In the present example, the color data 3110 is set to "Blue" in line with the setting of the hybrid recorder on the color registration screen 3100. The color data 3110 is stored in the lighting information storage unit 1300.

FIG. 5A shows an example of a screen for setting the blinking interval of the indicator to indicate the user who requested the process. FIG. 5B shows the construction of the blinking interval data, and an example of the set blinking interval.

A blinking interval setting screen 3200 is displayed for each apparatus so that a different blinking interval can be specified for each apparatus for indication of the user using the apparatus.

The present example shows that a blinking interval is registered for "Ichiro" specified in the user name 3201, in the hybrid recorder 1000. The check box 3202 for "Slow" is being checked.

The blinking interval data 3210 is composed of a user name 3211 and a blinking interval 3212, and indicates a blinking interval for each user. In the present example, a user with a name "Papa" specified in the user name 3211 is assigned with "Fast" as the blinking speed as specified in the blinking interval 3212. This indicates that when the user with the user name "Papa" is dubbing a content from HDD to DVD using the hybrid recorder 1000, the indicator of the game machine blinks at a "Fast" interval.

The blinking interval data 3210 is stored in the lighting information storage unit 1300 together with the color data 3110.

The color registration screen 3100 and the blinking interval setting screen 3200 are displayed on the display of the hybrid recorder 1000 or the screen of the digital television 8000.

It should be noted here that the registrations and settings may be performed using buttons or the like if the target apparatus is not provided with a display. Alternatively, a display of another apparatus, such as a personal computer, connected to the network may be used for the registrations and settings.

FIG. 6A shows an example of a screen for registering colors for each apparatus all at once. FIG. 6B shows the construction of the color data for each apparatus, and an example of the set colors.

An apparatus color registration screen 3300 is displayed on the lighting information server apparatus 4000 and is used to specify colors of the indicator for each apparatus.

In the present example, a color indicating an apparatus 3301 "TV" is being registered. Here, the "TV" indicates the digital television 8000 connected to the home network 9000.

The check box 3303 for color "red" is currently checked. It should be noted here that the check box for blue cannot be checked since blue has already been used, as the message 3302 "Used for Hybrid Recorder" indicates.

An apparatus color data 3310 is composed of an apparatus 3311 and a color 3312. The apparatus color data 3310 shows colors indicating each apparatus. In the present example, an apparatus "TV" specified in the apparatus 3311, namely the digital television, is assigned with color "Red" as specified in the color 3312. This indicates that, for example, when the game machine is executing a process of decoding video data encoded by MPEG2, which is a process requested from the TV, the indicator is lighted with color "Red".

The apparatus color data 3310 is stored in the lighting information storage unit 4200 of the lighting information server apparatus 4000.

The apparatus color registration screen 3300 is displayed on the display of the lighting information server apparatus 4000. It should be noted here that the registrations and settings may be performed using buttons or the like if the lighting information server apparatus 4000 is not provided with a display. Alternatively, a display of another apparatus, such as a digital television, connected to the network may be used for the registrations and settings.

In the present embodiment, the colors of the apparatuses can be registered from both each apparatus and the lighting information server. It is presumed however that only the latest registration is effective.

<Operation>

Figure 7:
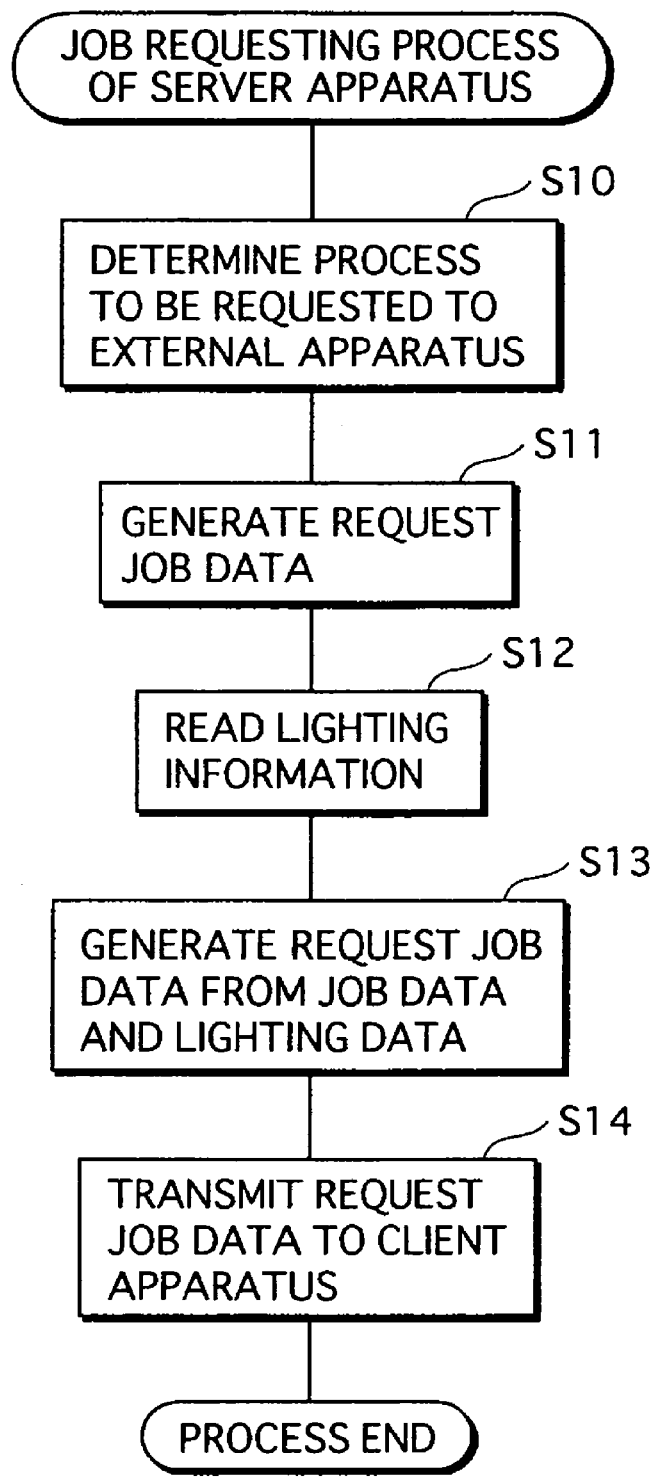
FIG. 7 is a flowchart showing the job requesting process performed by the server apparatus.
Figure 8:
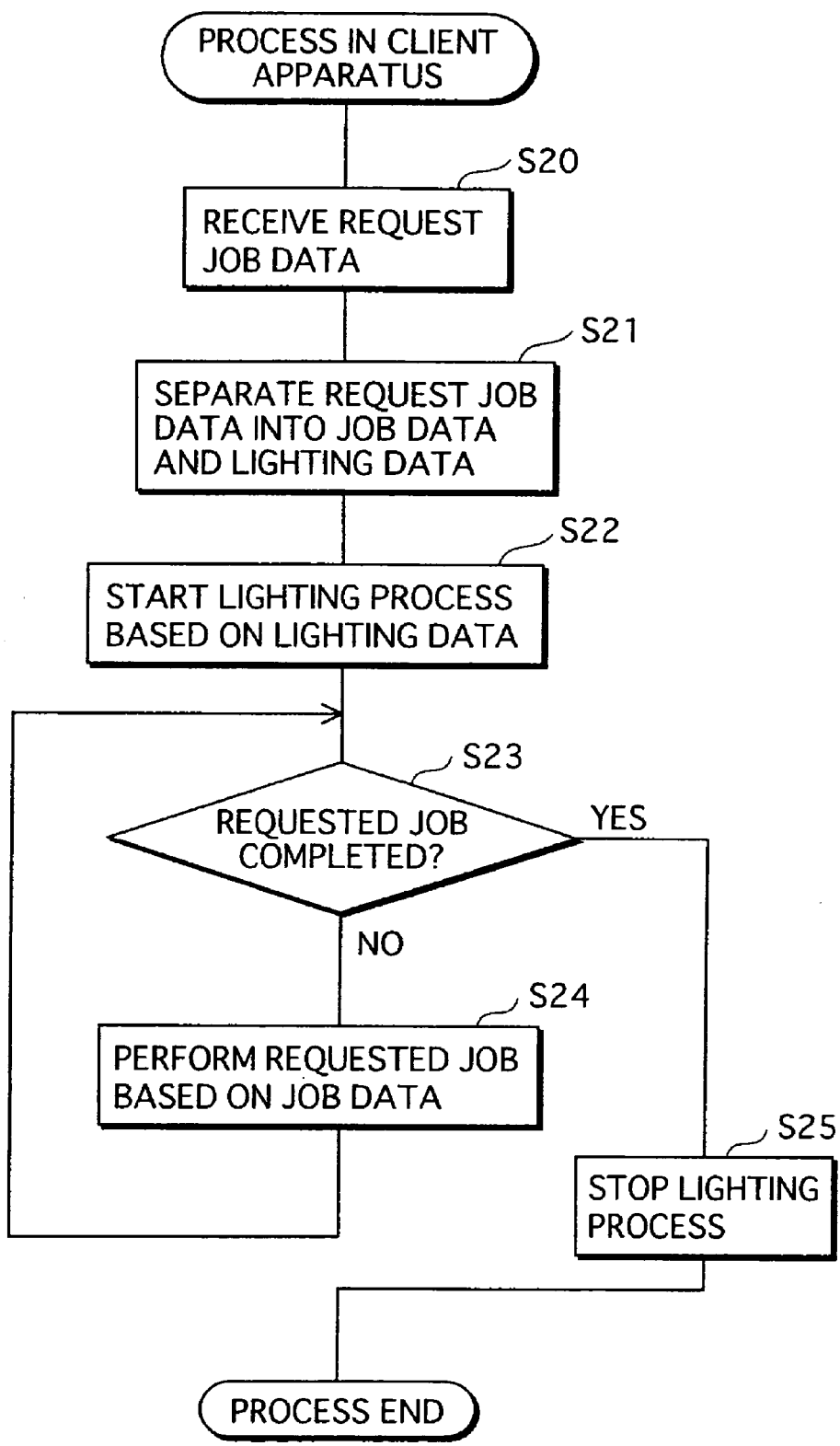
FIG. 8 is a flowchart showing the process performed by the client apparatus.
Figure 9:
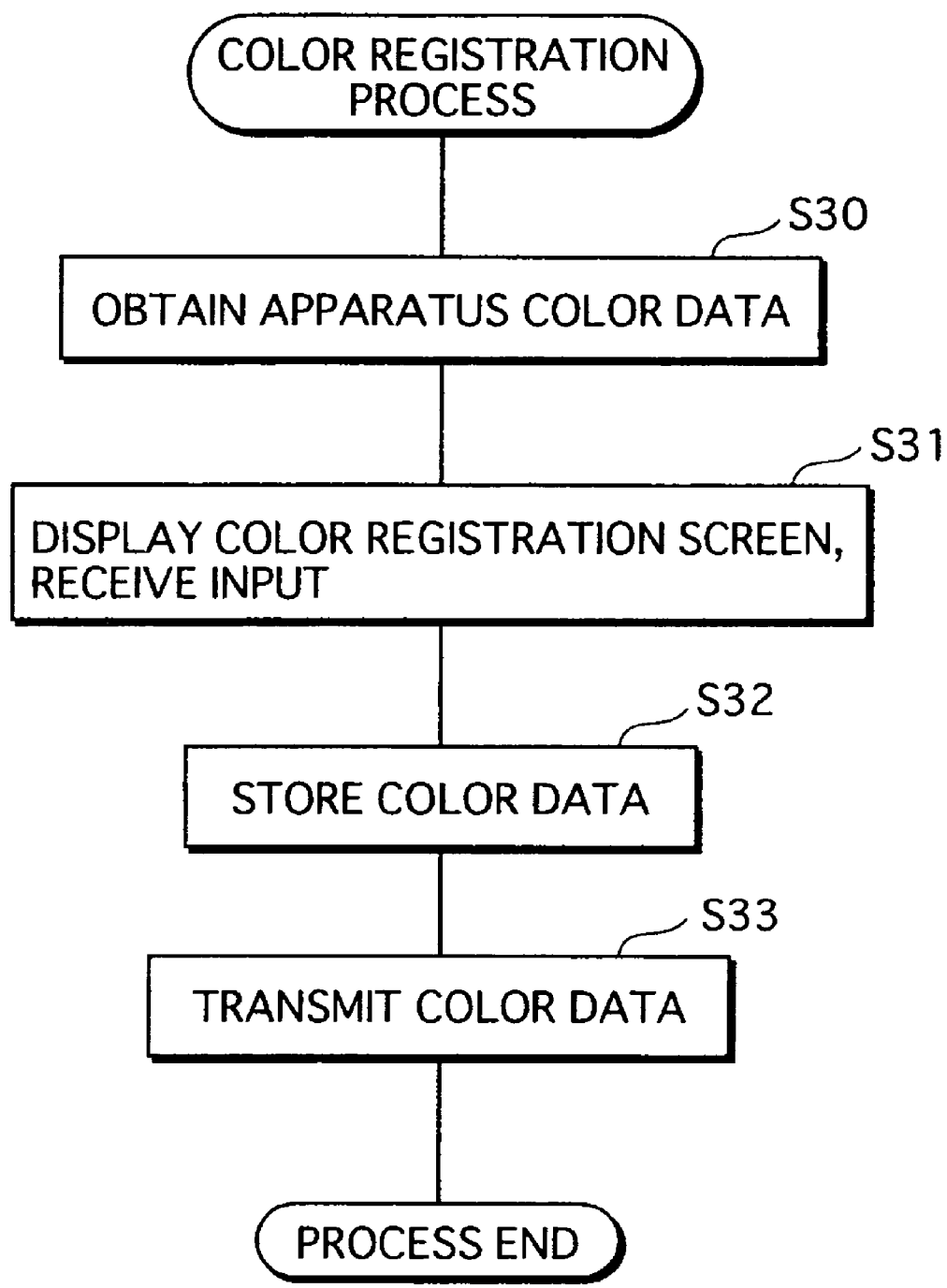
FIG. 9 is a flowchart showing the color registration process performed by each apparatus.

The following describes the operations of the hybrid recorder 1000 as a server apparatus, the game machine 2000 as a client apparatus, and the personal computer 4000 as the lighting information server apparatus, with reference to FIGS. 7-9.

More specifically, the following three operations will be described. The first operation is a process in which the hybrid recorder 1000 as a server apparatus requests a job to the game machine 2000 as a client apparatus. The second operation is a process performed by the game machine 2000 as a client apparatus that received a request. The third operation is a process in which each apparatus registers colors.

<1. Job Requesting Process of Server Apparatus>

The process will be described with reference to FIG. 7. FIG. 7 is a flowchart showing the job requesting process performed by the server apparatus.

It is presumed here that a family member with user name "Ichiro" dubs a content from HDD to DVD using the hybrid recorder 1000. The user specifies his/her user name, and depresses a dubbing button on the remote controller. In the present embodiment, it is presumed that the users can specify a user name by depressing a predetermined button on the remote controller. Upon receiving the dubbing instruction from the user, the user interface unit 1100 notifies the control unit 1400 of the dubbing instruction.

Upon receiving the notification of the dubbing instruction, the control unit 1400 determines a process, among processes for transcoding from MPEG2 to MPEG4, that is to be requested to another apparatus. That is to say, the control unit 1400 determines a job to request to another apparatus. At the same time, the control unit 1400 determines, among apparatuses connected to the home network 9000, an apparatus that is not using the information processing function thereof, as an apparatus to request the job to (step S10). In the present embodiment, it is presumed that the control unit 1400 determines the game machine 2000 as the apparatus to which it requests the job.

The control unit 1400 sends to the request job data generating unit 1500 the contents of a requested job and the information of the apparatus that is requested to perform the job, and instructs the request job data generating unit 1500 to generate the request job data, namely data of the requested job.

Upon being instructed to generate the request job data, the request job data generating unit 1500 generates request job data 1510 from the received contents of the requested job and information of the apparatus that is requested to perform the job (step S11).

The request job data generating unit 1500 reads lighting information from the lighting information storage unit 1300 to generate lighting data 1512 (step S12). More specifically, the request job data generating unit 1500 reads the color data 3110 and blinking interval data 3210, and generates lighting data 1520 based on the color data 3110 and the blinking interval 3212 "slow" corresponding to the user name 3211 "Ichiro" in the blinking interval data 3210.

The request job data generating unit 1500 generates request job data 1510 from the generated job data 1511 and lighting data 1512 (step S13), and transmits the generated request job data 1510 to the game machine 2000 which is the apparatus requested to perform the job, via the transmission/reception unit 1600 (step S14).

<2. Process in Client Apparatus>

The process will be explained with reference to FIG. 8. FIG. 8 is a flowchart showing the process performed by the client apparatus.

The transmission/reception unit 2500 of the game machine 2000 receives the request job data 1510 (step S20), and sends the received request job data to the request job data analyzing unit 2400.

Upon receiving the request job data 1510, the request job data analyzing unit 2400 separates the request job data 1510 into the job data 1511 and the lighting data 1512, and sends the job data 1511 to the requested job executing unit 2300. The request job data analyzing unit 2400 sends the lighting information to the lighting control unit 2200, notifying it of a lighting start (step S21).

Upon receiving the job data 1511, the requested job executing unit 2300 performs the requested job (step S24).

Upon receiving the notification of the lighting start, the lighting control unit 2200 instructs the user interface unit 2100 to light the indicator based on the lighting data 1512 (step S22). In the present example, the indicator of the game machine 2000 is lighted blue and blinks at a slow speed.

When the execution of the job ends (step S23), the requested job executing unit 2300 notifies the lighting control unit 2200 of the end of the job.

Upon receiving the notification of the end of the job, the lighting control unit 2200 instructs the user interface unit 2100 to stop lighting (step S25). In the present example, the indicator of the game machine 2000 stops lighting.

<3. Color Registration Process in Each Apparatus>

The process will be described with reference to FIG. 9. FIG. 9 is a flowchart showing the color registration process performed by each apparatus.

In this example, the hybrid recorder 1000 registers a color.

First, the user operates to display the color registration screen 3100 for registration of colors. Upon receiving the operation for the display, the user interface unit 1100 requests the latest apparatus color data 3310 to the lighting information registration processing unit 1200.

Upon receiving the request for the latest apparatus color data 3310, the lighting information registration processing unit 1200 requests, via the transmission/reception unit, the lighting information server apparatus 4000 to send the apparatus color data 3310.

The lighting information server apparatus 4000 reads the apparatus color data 3310 from the lighting information storage unit 4200, and sends the read data to the hybrid recorder 1000. The lighting information registration processing unit 1200 receives the apparatus color data 3310 via the transmission/reception unit 1600 (step S30).

Upon receiving the apparatus color data 3310, the lighting information registration processing unit 1200 sends the latest apparatus color data 3310 to the user interface unit 1100. The user interface unit 1100 displays the color registration screen based on the received latest apparatus color data 3310, and receives an input from the user (step S31).

Upon receiving the input from the user, the user interface unit 1100 sends the acquired color to the lighting information registration processing unit 1200. In the present example, the acquired color is blue.

Upon receiving the color, the lighting information registration processing unit 1200 generates color data 3110, defining the received color as the color of the apparatus itself, and stores the generated color data 3110 into the lighting information storage unit 1300 (step S32).

The lighting information registration processing unit 1200 transmits the color and the identification information of the apparatus itself to the lighting information server apparatus 4000 (step S33).

Upon receiving the color and the identification information of the hybrid recorder 1000, the lighting information server apparatus 4000 rewrites the color of the hybrid recorder 1000 in the apparatus color data 3310 stored in the lighting information storage unit 4200.

<Supplementary Notes>

Up to now, an embodiment of the processing apparatus of the present invention has been described. However, the present invention is not limited to the embodiment, but may be modified as follows, for example.

(1) In the above-described embodiment, the lighting information server apparatus manages the lighting information for all apparatuses on the network. However, not limited to this, each apparatus may manage the color of the apparatus itself, and the user may manage the colors of all the apparatuses.

(2) In the above-described embodiment, the game machine 2000, a client apparatus, is requested to perform part of the process of converting the compression method of a content. However, the process requested to other apparatuses as a distributed processing is not limited to such a transcoding process. For example, image processing, dubbing processing, or a process of performing a large amount of calculations may be requested to other apparatuses as a distributed processing.

(3) In the above-described embodiment, the colors of the lighted indicator are used to identify the apparatuses, and the blinking intervals are used to identify the users. However, not limited to this, the colors may be used, for example, to indicate the importance levels of the processes. That is to say, the colors and blinking intervals of lighting of the indicator may be used to indicate varieties of information.

For example, when a client apparatus includes a plurality of calculating apparatuses, the indicator may indicate the number of calculating apparatuses that are used to perform a requested process. As one example, as the number of used calculating apparatuses increases, the indicator may blink at a faster speed.

Also, the indicator may be used to indicate whether or not the client apparatus can be recovered when it is powered off.

(4) In the above-described embodiment, an indicator, which is installed in an apparatus, is used to indicate the performing state of the apparatus by blinking. However, not limited to this, an indicator attached to the apparatus via a relay device, a cable, an outlet or the like may be used instead.

Not limited to visual means, aural means, tactual means or the like may be used. For example, different music tunes may sound or different vibrations may be provided in response to respective requesting apparatuses.

In the above-described embodiment, a lighting apparatus is used to indicate information. However, a communication apparatus may be used instead. For example, a small crystal liquid display or the like may be used to provide information by characters, graphics, signs, colors or the like.

(5) In the above-described embodiment, the indicator is composed of one lighting apparatus (see FIG. 1). Not limited to this, however, the indicator may be composed of a plurality of lighting apparatuses. The lighting apparatuses may have the same size or different sizes. Also, the lighting apparatuses may be arranged in a variety of ways. For example, the lighting apparatuses may be arranged in a straight line or a circle.

In other words, it is possible for the present invention to provide a variety of types of information by combining the colors and number of the lighting apparatuses. More specifically, the requesters may be assigned with different numbers of lighted lighting apparatuses, respectively, or the importance levels of the requested processes may be assigned with different numbers of lighted lighting apparatuses respectively.

Further, the number of lighted lighting apparatuses may represent the progress of the requested process. In this case, for example, the requested job executing unit of the client apparatus side manages the progress of the process, and controls the number of lighted lighting apparatuses.

(6) In the above-described embodiment, the server apparatus transmits the job data, together with the lighting information attached thereto, to the client apparatus. However, the server apparatus may transmit the job data, together with, for example, an identifier of the server apparatus, to the client apparatus.

In this case, for example, the client apparatus stores a table that shows the identifiers of the server apparatuses and pieces of lighting information, with indication of correspondences between them, and lights the indicator based on a piece of lighting information corresponding to an identifier of a server apparatus that requested the job, by referring to the table.

The table that shows the identifiers of the server apparatuses and pieces of lighting information may be generated when the apparatuses register the information of the other apparatuses with the apparatuses themselves. More specifically, each apparatus sends an identifier of the apparatus and lighting information of the apparatus, to each of the other apparatuses on the network. Upon receiving such information, each apparatus generates a table that shows correspondence between the identifiers of the server apparatuses and pieces of lighting information, based on the received information, and stores the generated table. With this construction, it is possible to update the correspondence table each time a new apparatus is registered with the network, thus enabling the apparatuses on the network to always share the latest information.

(7) In the above-described embodiment, the indicator is lighted when the apparatus is performing the requested job. However, the present invention is not limited to this.

For example, the indicator may be lighted when a job is requested, immediately before a requested job starts to be performed, or when a requested job has been completed.

(8) In the above-described embodiment, different colors are assigned to the apparatuses, and different blinking intervals are assigned to the users. However, two or more apparatuses or two or more users may share a same color or a same blinking interval.

(9) In the above-described embodiment, the client apparatus is requested to perform a process by one server apparatus. However, not limited to this, the client apparatus may be requested to perform processes by a plurality of server apparatuses.

In this case, the client apparatus may perform the processes requested by the plurality of server apparatuses, one by one, or with the multitasking process.

When the client apparatus performs the requested processes with the multitasking process, the indicator is lighted based on pieces of lighting information sent from all the plurality of server apparatuses, in sequence. With this construction, the user can immediately recognize visually which apparatus requested the process currently performed by the apparatus.

(10) The processing apparatus of the present invention is applicable to various distributed computing environments.

For example, the processing apparatus of the present invention is applicable to a distributed computing environment in which a plurality of apparatuses are connected to each other via a high-speed network such as an optical fiber network so that the calculation resources and memories of the other apparatuses can be used as if they are resources of the apparatus itself.

(11) A program for causing CPU to execute control processes to achieve the functions of the processing apparatus of the above-described embodiment (see FIG. 2) may be recorded onto a recording medium and circulated or distributed via the recording medium, or may be circulated or distributed via any communication paths. Such a recording medium includes the IC card, optical disc, flexible disk, ROM, flash memory and the like. The circulated or distributed program is stored in a memory that can be read by the CPU of the apparatus so that the program can be used in the apparatus. The CPU executes the program and causes the apparatus to achieve the functions of the processing apparatus of the above-described embodiment.

(12) Part or all of the functional blocks of the requested job executing unit 2300, the request job data analyzing unit 2400, the lighting control unit 2200 and the like of the client apparatus is typically achieved as an LSI being an integrated circuit. Each of the functional blocks may be achieved in one chip, or part or all of the functional blocks may be achieved in one chip. Similarly, part or all of the functional blocks of the lighting information registration processing unit 1200, the lighting information storage unit 1300, the control unit 1400, the request job data generating unit 1500 of the server apparatus is achieved as separate LSI chips or one LSI chip.

It should be noted here that although the term LSI is used here to indicate an integrated circuit, the integrated circuit may be called IC, system LSI, super LSI, ultra LSI or the like, depending on the level of integration.

Also, the integrated circuit is not limited to the LSI, but may be achieved by a dedicated circuit or a general purpose processor. It is also possible to achieve the integrated circuit by using the FPGA (Field Programmable Gate Array) that can be re-programmed after the LSI is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

INDUSTRIAL APPLICABILITY

The present invention is useful in a system in which distributed processing is available, in particular in judging whether or not the user can use a certain apparatus.

The invention claimed is:

1. A processing apparatus connected with a second processing apparatus via a network, the processing apparatus comprising:
  an indicator that blinks a lighting element in different colors;
  a receiver that receives request data from the second processing apparatus, the request data including:
    (i) a request to execute a distributed process;
    (ii) data on which the requested distributed process is to be executed; and
    (iii) color information for identifying the second processing apparatus which has requested the distributed process;
  an executer that executes the requested distributed process; and
  a controller that controls the indicator to blink the lighting element in a specified color, based on the color information received by the receiver, while the executer executes the requested distributed process.

2. The processing apparatus of claim 1, wherein the requested distributed process received by the receiver is a process for encoding image data.

3. The processing apparatus of claim 1, wherein the requested distributed process received by the receiver is a process for converting image data encoded in a predetermined encoding format into image data encoded in a different encoding format.

4. The processing apparatus of claim 1 being a home electric appliance which performs an original purpose of the home electric appliance and also executes the requested distributed process.

5. An integrated circuit for a processing apparatus that is connected with a second processing apparatus via a network, the processing apparatus including an indicator that blinks a lighting element in different colors, the integrated circuit comprising:
  a receiver that receives request data from the second processing apparatus, the request data including:
    (i) a request to execute a distributed process;
    (ii) data on which the requested distributed process is to be executed; and
    (iii) color information for identifying the second processing apparatus which has requested the distributed process;
  an executer that executes the requested distributed process; and
  a controller that controls the indicator to blink the lighting element in a specified color, based on the color information received by the receiver, while the executer executes the requested distributed process.

6. A non-transitory computer-readable recording medium having stored therein a computer program for causing a processing apparatus, which is connected with a second processing apparatus via a network, the processing apparatus including an indicator that blinks a lighting element in different colors, to execute a requested distributed process, the computer program having instructions for causing a computer to perform a method comprising:
  receiving request data from the second processing apparatus, the request data including:
    (i) a request to execute the distributed process;
    (ii) data on which the requested distributed process is to be executed; and
    (iii) color information for identifying the second processing apparatus which has requested the distributed process;
  executing the requested distributed process; and
  controlling the indicator to blink the lighting element in a specified color, based on the received color information, while executing the requested distributed process.

7. A processing system comprising a server apparatus and a plurality of processing apparatuses that communicate with the server apparatus,
  each processing apparatus including:
    an indicator that blinks a lighting element in different colors;
    a receiver that receives request data from a different processing apparatus, the request data including:
      (i) a request to execute a distributed process;
      (ii) data on which the requested distributed process is to be executed; and
      (iii) color information for identifying the different processing apparatus which has requested the distributed process;
    an executer that executes the requested distributed process;
    a controller that controls the indicator to blink the lighting element in a specified color, based on the color information received by the receiver, while the executer executes the requested distributed process; and
    a transmitter that transmits, to the server apparatus, color information for identifying itself as a particular processing apparatus, and the server apparatus including:
a storage device that, when the server apparatus receives color information from the particular processing apparatus, stores the received color information that identifies the particular processing apparatus from which the color information was received.

8. The processing apparatus of claim 1, wherein
the color information further includes a blinking interval for identifying a user who requested that the distributed process be performed, and
the controller further controls the indicator to blink the lighting element according to the blinking interval.

9. The processing apparatus of claim 1, wherein
the controller further controls the indicator to indicate, while the processing apparatus is executing the distributed process, whether or not the processing apparatus can recover if the processing apparatus is powered off.

10. The processing apparatus of claim 1, further comprising:
a plurality of calculators to execute the requested distributed process faster, wherein
while the executer is executing the requested distributed process, the controller controls the indicator to indicate, using the lighting element, the number of the calculators that are being used to perform the requested distributed process.

11. The processing apparatus of claim 1, wherein
the indicator includes a plurality of lighting elements,
the level of importance of the requested distributed process is assigned a specific number of lighting elements, and
the controller controls the indicator to indicate, using the plurality of lighting elements, the importance level of the requested distributed process.

* * * * *